United States Patent
Saito et al.

(10) Patent No.: US 7,162,867 B2
(45) Date of Patent: Jan. 16, 2007

(54) EXHAUST GAS PURIFYING DEVICE FOR INTERNAL COMBUSTION ENGINE

(75) Inventors: Makoto Saito, Okazaki (JP); Shigeto Yahata, Obu (JP); Kazuharu Tochikawa, Kariya (JP); Kanehito Nakamura, Ichinomiya (JP); Tsukasa Kuboshima, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/228,292

(22) Filed: Sep. 19, 2005

(65) Prior Publication Data
US 2006/0059901 A1 Mar. 23, 2006

(30) Foreign Application Priority Data
Sep. 21, 2004 (JP) ............................. 2004-273790

(51) Int. Cl.
*F01N 3/00* (2006.01)
(52) U.S. Cl. ........................................ 60/295; 60/297
(58) Field of Classification Search .................. 60/295, 60/297, 274
See application file for complete search history.

(56) References Cited

U.S. PATENT DOCUMENTS

| 4,923,484 | A | * | 5/1990 | Saito ............................. 95/20 |
| 6,829,889 | B1 | | 12/2004 | Saito et al. |
| 6,910,329 | B1 | * | 6/2005 | Bunting et al. ................ 60/297 |
| 6,962,046 | B1 | * | 11/2005 | Kuboshima et al. ........... 60/295 |
| 6,969,413 | B1 | * | 11/2005 | Yahata et al. ............... 55/282.3 |
| 7,033,548 | B1 | * | 4/2006 | Pahlman et al. ............. 422/170 |
| 7,051,519 | B1 | * | 5/2006 | Kuboshima et al. ........... 60/286 |
| 7,062,905 | B1 | * | 6/2006 | Khair et al. ................... 60/295 |
| 2004/0172933 | A1 | | 9/2004 | Saito et al. |

FOREIGN PATENT DOCUMENTS

JP 7-332065 12/1995

OTHER PUBLICATIONS

U.S. Appl. No. 11/220,596, filed Sep. 8, 2005.
U.S. Appl. No. 11/070,368 filed Mar. 3, 2005, Inventor: Saito et al. (not yet published).

* cited by examiner

*Primary Examiner*—Thomas E. Denion
(74) *Attorney, Agent, or Firm*—Nixon & Vanderhye P.C.

(57) ABSTRACT

An exhaust gas purifying device for an engine includes a particulate filter midway in an exhaust passage for collecting particulate matters. A control means calculates an accumulating amount of particulate matters on the particulate filter. An accumulating amount calculating means calculates the accumulating amount in accordance with an accumulating characteristic and differential pressure of the particulate filter detected using a differential pressure detecting means. When the accumulating amount becomes a predetermined regeneration demand amount, the control means performs a forcible regeneration, in which particulate matters on the particulate filter are burned and removed to regenerate the particulate filter.

7 Claims, 13 Drawing Sheets

EXHAUST GAS PURIFYING DEVICE FOR INTERNAL COMBUSTION ENGINE

CROSS REFERENCE TO RELATED APPLICATIONS

This application is based on and incorporates herein by reference Japanese Patent Application No. 2004-273790 filed on Sep. 21, 2004.

FIELD OF THE INVENTION

The present invention relates to an exhaust gas purifying device for an internal combustion engine. More particularly, the present invention relates to a regeneration method of a particulate filter.

BACKGROUND OF THE INVENTION

In recent years, it is desired to reduce exhaust gas emitted from a vehicular internal combustion engine. Specifically, particulate matters such as soot and SOF are contained in exhaust gas of a diesel engine, as well as CO, HC, and NOx, and such particulate matters need to be removed from exhaust gas. Therefore, a particulate filter is provided to an exhaust passage to correct particulate matters in exhaust gas.

The particulate filter includes porous partition walls, through which exhaust gas passes. Particulate matters contained in exhaust gas are corrected when exhaust gas flows through the surface of the partition walls and pores. When the amount of particulate matters accumulating on the filter excessively increases, flow resistance of exhaust gas increases in the particulate filter. As a result, backpressure increases in the engine, and engine performance may decrease. Accordingly, particulate matters corrected by the particulate filter need to be removed for regeneration of the particulate filter to maintain filtering performance for correcting particulate matters in exhaust gas.

A conventional particulate filter has an oxidation catalyst such as platinum to perform regeneration of the particulate filter using oxidizing property of the catalyst. Specifically, fuel is supplied to the particulate filter in a post injection, in which fuel is injected in an exhaust stroke of the engine, for example.

The particulate filter oxidizes particulate matters accumulating on the filter to remove the particulate matters with combustion heat. Thereby, particulate matters, which are hard to be oxidized compared with the injected fuel, can be eliminated from the particulate filter.

When regeneration of the particulate filter is frequently performed, fuel efficiency of the engine is degraded. By contrast, when an interval between regenerations of the particulate filter becomes excessively long, an amount of particulate matters accumulating on the filter becomes excessively large. In this case, when regeneration of the filter is performed, particulate matters on the filter may quickly burn, and temperature of the particulate filter may excessively increase, therefore the particulate filter may be broken. Therefore, the amount of particulate matters is preferably estimated to determine the timing of regeneration of the filter. According to JP-A-7-332065, differential pressure between an inlet of the particulate filter and an outlet of the particulate filter is detected to determine a regeneration timing of the particulate filter. Specifically, when the differential pressure of the particulate filter exceeds a threshold, an amount of particulate matters on the filter is determined to be large, and regeneration of the particulate filter is performed.

However, even when the operating condition of the engine such as the differential pressure of the particulate filter is substantially the same, actual amount of particulate matters accumulating on the particulate filter may vary. Accordingly, it is difficult to precisely evaluate the amount of particulate matters accumulating on the particulate filter in accordance with only the differential pressure of the particulate filter.

SUMMARY OF THE INVENTION

In view of the foregoing and other problems, it is an object of the present invention to produce an exhaust gas purifying device for an internal combustion engine, the purifying device is capable of properly estimating an accumulating amount of particulate matters.

According to one aspect of the present invention, an exhaust gas purifying device for an internal combustion engine includes a particulate filter, a differential pressure detecting means, and a control means. The particulate filter is provided midway in an exhaust passage. The particulate filter collects particulate matters contained in exhaust gas. Particulate matters accumulate on the particulate filter by being collected by the particulate filter.

The differential pressure detecting means detects differential pressure of the particulate filter. The control means performs a forcible regeneration, in which particulate matters accumulating on the particulate filter are burned and removed to regenerate the particulate filter, when an accumulating amount of particulate matters accumulating on the particulate filter becomes a predetermined regeneration demand amount.

The control means includes an accumulating amount calculating means, which calculates the accumulating amount in accordance with an accumulating characteristic and at least the differential pressure. The control means defines the accumulating characteristic that is a relationship between the accumulating amount and the differential pressure. The control means defines a former increasing characteristic line on a side, on which the accumulating amount is equal to or less than an accumulating amount defined on a predetermined transition point. The former increasing characteristic line is a substantially straight line passing through an initial point, on which the accumulating amount is zero.

The control means defines a latter increasing characteristic line on a side, on which the accumulating amount is greater than the accumulating amount defined on the transition point. The latter increasing characteristic line is a substantially straight line having a slope gentler than a slope of the former increasing characteristic line. The differential pressure increases from the initial point along the former increasing characteristic line, and when the differential pressure becomes greater than a differential pressure defined on the transition point, the differential pressure increases along the latter increasing characteristic line. The control means defines a limit accumulating characteristic with a substantially straight line that passes through the initial point and has a slope substantially the same as the slope of the latter increasing characteristic line.

The control means further includes a forcible transition means that performs a forcible transition when the accumulating amount, which is calculated in accordance with the accumulating characteristic, enters a predetermined forcible transition area. Particulate matters accumulating on the particulate filter are burned in the forcible transition until the accumulating characteristic substantially becomes the limit accumulating characteristic. The accumulating amount calculating means moves the accumulating characteristic to the limit accumulating characteristic until the accumulating characteristic substantially becomes the limit accumulating characteristic when particulate matters accumulating on the particulate filter are burned by the forcible transition means.

Thus, the accumulating amount increases along the line of the limit accumulating characteristic after performing the forcible transition, so that the accumulating amount of particulate matters can be accurately estimated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 1:
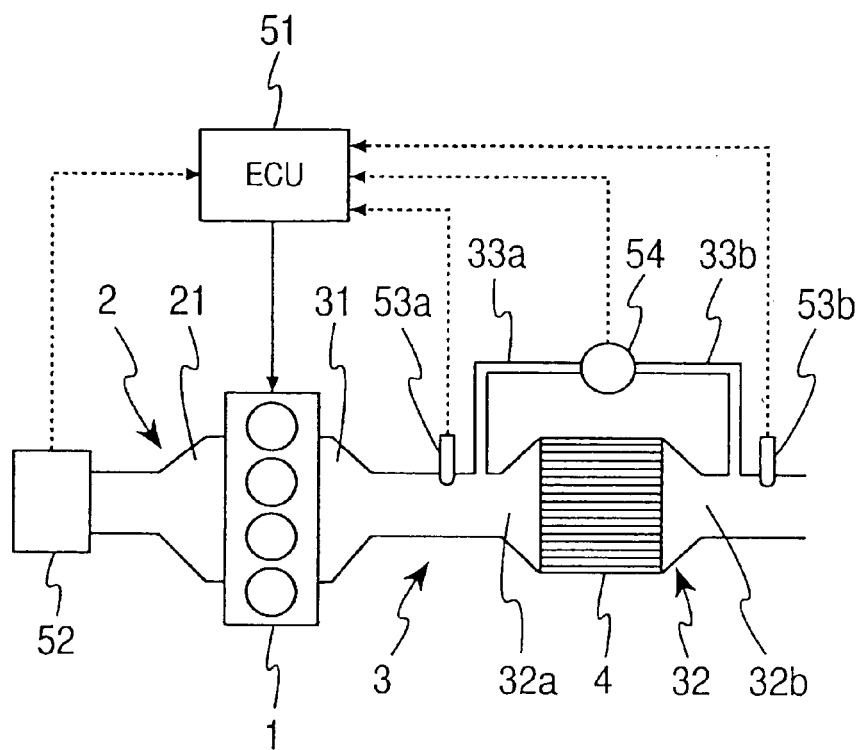
FIG. 1 is a schematic view showing an internal combustion engine including an exhaust gas purifying device, according to a first embodiment of the present invention.

A diesel engine shown in FIG. 1 is a four-cylinder engine that includes an engine body 1, to which an intake manifold 21 and an exhaust manifold 31 are connected. The intake manifold 21 is a most downstream portion of an intake passage 2. The exhaust manifold 31 is a most upstream portion of an exhaust passage 3. A particulate filter 32 connects to the exhaust manifold 31 in the exhaust passage 3. The particulate filter 32 has a filter body 4, which is constructed of a honeycomb member formed of a porous ceramic such as cordierite and silicon carbide, in which passages are partially plugged. Exhaust gas flows from respective cylinders of the engine body 1 into an inlet 32a of the filter body 4, passes through partition walls of the porous structure of the filter body 4, and flows out of the outlet 32b of the filter body 4. While exhaust gas flows through the filter body 4, particulate matters contained in exhaust gas are corrected by the particulate filter 32. An amount of particulate matters corrected by the particulate filter 32 increases as the vehicle travels. The surface of the filter body 4 of the particulate filter 32 supports oxidation catalyst, which is mainly formed of precious metal such as platinum and palladium. The oxidation catalyst oxidizes particulate matters under a specific temperature condition, and burns to remove the particulate matters.

An ECU (electronic control unit, control means) 51 is provided to the vehicle to control components of the engine such as an injector. The ECU 51 inputs various signals representing an operating condition of the vehicle. The various signals include a signal representing the amount (PM accumulating amount ML) of particulate matters accumulating on the particulate filter 32. The signal representing the PM accumulating amount ML is detected using a sensor.

Temperature sensors 53a, 53b are mounted to the exhaust passage 3 such that the temperature sensors 53a, 53b respectively penetrate a wall of the exhaust passage 3 to detect temperature of exhaust gas. The temperature sensor 53a is provided to an immediately upstream portion of the particulate filter 32 and the temperature sensor 53b is provided to an immediately downstream portion of the particulate filter 32. Detection signal (DPF inlet temperature) of the temperature sensor 53a represents temperature of exhaust gas flowing through the inlet 32a of the particulate filter 32. Detection signal (DPF outlet temperature) of the temperature sensor 53b represents temperature of exhaust gas flowing through the outlet 32b of the particulate filter 32. Temperature (DPF temperature) of the particulate filter 32 is calculated in accordance with the DPF inlet temperature and the DPF outlet temperature using averaging calculation and filtering processing, for example.

A first branch 33a branches from an immediately upstream portion of the particulate filter 32 in the exhaust passage 3. A second branch 33b branches from an immediately downstream portion of the particulate filter 32 in the exhaust passage 3. The first branch 33a and the second branch 33b connect with a differential pressure sensor 54 (differential pressure detecting means). The differential pressure sensor 54 detects differential pressure between the inlet 32a of the particulate filter 32 and the outlet 32b of the particulate filter 32. The differential pressure detected using the differential pressure sensor 54 represents differential pressure (pressure loss) arising through the particulate filter 32.

A flowmeter 52 is provided to the intake passage 2 to detect an amount of intake gas. Various parameters such as an accelerator position and temperature of cooling water are input to the ECU 51. The ECU 51 is mainly constructed of a microcomputer. The ECU 51 includes a ROM that stores an operation control program, a regeneration control program, and the like. The operation control program controls components of the engine. The regeneration control program calculates the PM accumulating amount ML of particulate matters accumulating on the particulate filter 32, and determines whether the ECU 51 performs regeneration of the particulate filter 32, in accordance with the PM accumulating amount ML of particulate matters. The ROM stores information that is used for specifying accumulating property of particulate matters used in the regeneration control program.

Figure 2:
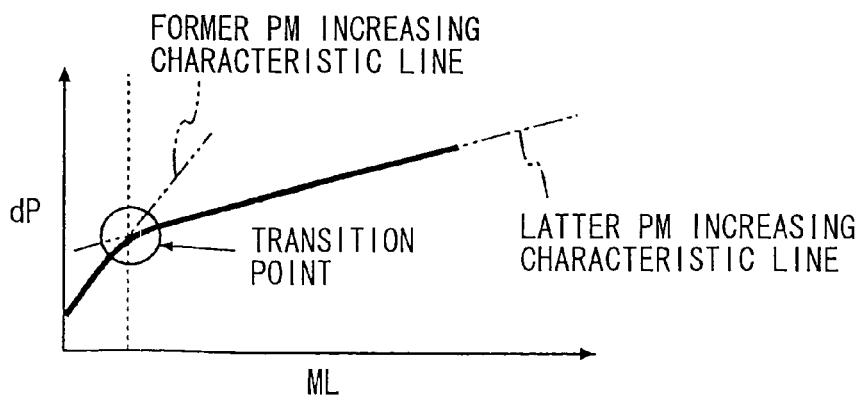
FIG. 2 is a graph showing a relationship between an amount of particulate matters accumulating on a particulate filter and differential pressure of the particulate filter provided to the exhaust gas purifying device, when particulate matters accumulate on the particulate filter, according to the first embodiment.

FIG. 2 depicts a relationship between differential pressure dP and the PM accumulating amount ML of particulate matters. In the condition of FIG. 2, a flow amount of exhaust gas is constant, and particulate matters accumulate from one of the two following conditions, in which the particulate filter 32 is completely brand-new and the particulate filter 32 is completely regenerated. In these two conditions, particulate matters are not on the particulate filter 32. The differential pressure dP increases as the PM accumulating amount ML increases. A profile representing the relationship between the differential pressure dP and the PM accumulating amount ML is upwardly substantially convex. Specifically, a characteristic line (accumulating characteristic) representing the relationship can be depicted using straight lines. The slope of one straight line discontinuously changes at a point (transition point, increasing transition point), in which the PM accumulating amount ML becomes a specific amount. The slope of the other straight line becomes gentle after the PM accumulating amount ML exceeds the amount on the transition point. The accumulating characteristic of the particulate matters, when the PM accumulating amount ML increases, can be approximated using the two straight lines.

Figure 3A:
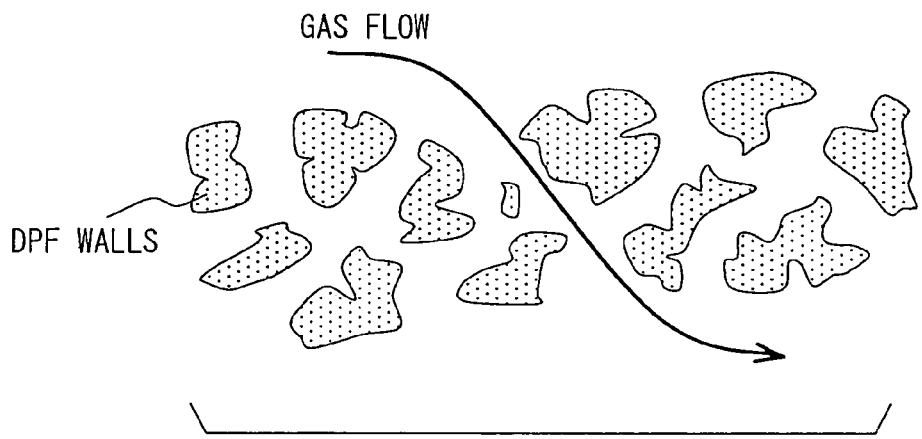
FIGS. 3A, 3B, and 3C are schematic views showing a condition, in which particulate matters accumulate on the particulate filter, according to the first embodiment.
Figure 3B:
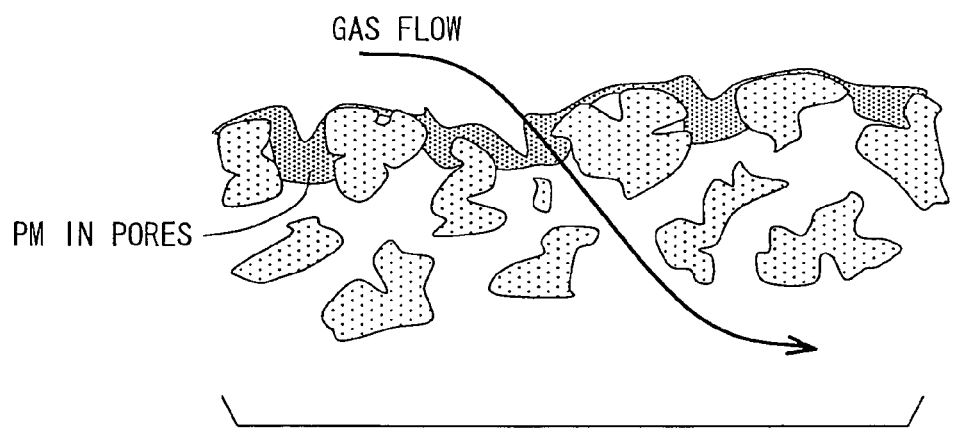
Figure 3C:
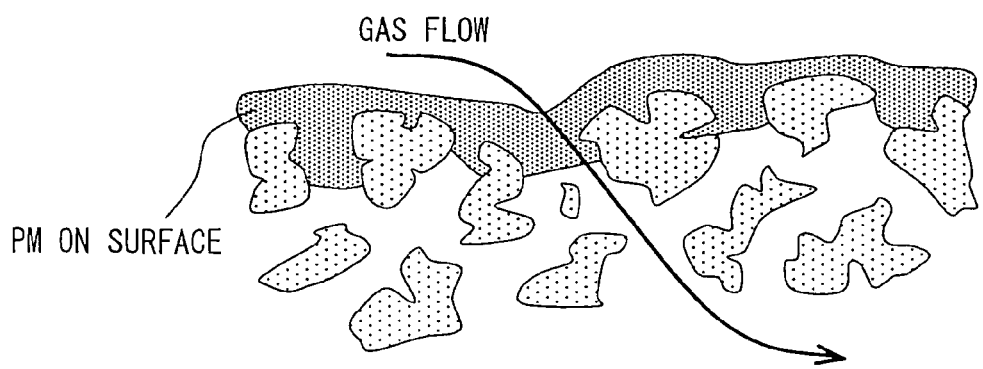

As shown in FIGS. 3A, 3B, and 3C, particulate matters accumulate on the partition walls (DPF walls) of the filter body 4 of the particulate filter 32 in this order, and the PM accumulating amount ML increases in this order. Specifically, FIG. 3A depicts a condition, in which the particulate filter 32 is brand new or is immediately after regeneration, and particulate matters do not accumulate on the particulate filter 32. In this condition, pressure difference (pressure loss) dP arising when exhaust gas passes through the DPF walls can be specified by a dimensional specification of the particulate filter 32. Particulate matters accumulate from the condition shown in FIG. 3A to the condition shown in FIG. 3B, in which particulate matters accumulate on the surface of the DPF walls on the upstream side thereof, and the particulate matters plug the pores. In this situation, exhaust gas flows through the particulate matters plugging the pores along the arrow in FIG. 2B. Therefore plugging the pores with the particulate matters is a dominant factor of increasing in differential pressure dP.

As shown in FIG. 3C, when most of the pores are plugged, and a layer (PM accumulating layer) of the particulate matters is formed throughout the surface of the DPF walls, the thickness of the PM accumulating layer increases as the particulate matters further accumulate. In this situation, increasing in thickness of the PM accumulating layer, which covers the DPF walls, is a dominant factor of increasing in the differential pressure dP.

The dominant factor of increasing in the differential pressure dP before the transition point is different from the dominant factor after the transition point, in which most of the pores are plugged and the PM accumulating layer are formed on the DPF walls. When the pores are not plugged with particulate matters, exhaust gas can easily pass through pores. However, when pores are substantially plugged with particulate matters, exhaust gas cannot easily pass through the pores, and the differential pressure dP quickly increases. As referred to FIG. 2, a rate of change (increasing degree) of the differential pressure dP with respect to the PM accumulating amount ML is relatively large on a former PM increasing characteristic line before most of the pores are plugged with particulate matters.

The rate of change of the differential pressure dP with respect to the PM accumulating amount ML is relatively small on a latter PM increasing characteristic line after most of the pores are plugged. In this condition, a dominant factor of increasing in the differential pressure dP is increasing in the thickness of the PM accumulating layer.

Figure 4:
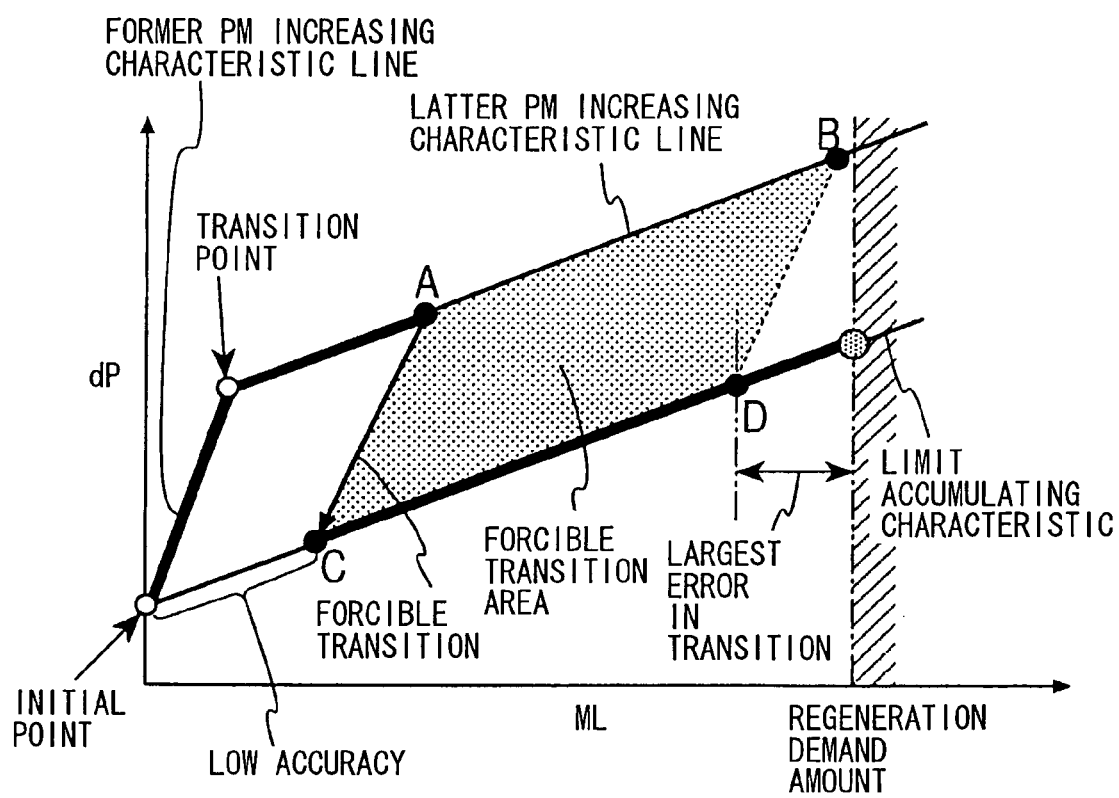
FIG. 4 is a graph showing a relationship between the amount of particulate matters accumulating on the particulate filter and differential pressure of the particulate filter when particulate matters accumulate on the particulate filter and when particulate matters accumulating on the particulate filter are removed, according to the first embodiment.

FIG. 4 depicts an accumulating characteristic that tracks from an initial point along the former and latter PM increasing characteristic lines. FIG. 4 also depicts the relationship between the differential pressure dP and the PM accumulating amount ML in a condition, in which particulate matters accumulating on the particulate filter 32 burn so that the PM accumulating amount ML decreases. When particulate matters accumulating on the particulate filter 32 burn and disappear, the differential pressure dP and the PM accumulating amount ML move to the side of the initial point. However, the differential pressure dP and the PM accumulating amount ML do not track the former and latter PM increasing characteristic lines when particulate matters burn and disappear from the particulate filter 32. When particulate matters burn, the relationship between the differential pressure dP and the PM accumulating amount ML moves from the point A to the point C. The line connecting between the point A and the point C has a slope, which is intermediate between the slopes of the former and latter PM increasing characteristic lines. When the relationship moves from the point A to the point C, particulate matters plugging the pores are apt to burn, so that the slope of this line between the point A and the point C is similar to the slope of the former PM increasing characteristic line.

Figure 5:
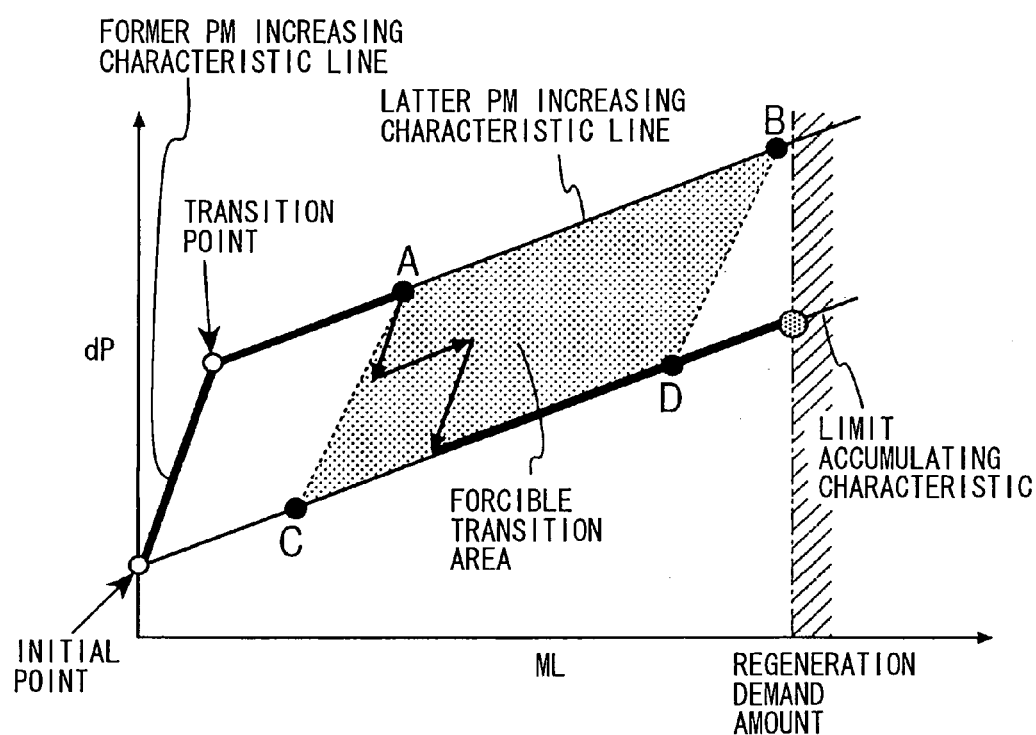
FIG. 5 is a graph showing a relationship between the amount of particulate matters and the differential pressure of the particulate filter when particulate matters accumulate on the particulate filter and are removed from the particulate filter, according to the first embodiment.

As shown in FIG. 5, particulate matters accumulating on the particulate filter 32 intermediately stop burning, for example. In this situation, when particulate matters start accumulating from an intermediate point between the point A and the point B, the relationship between the differential pressure dP and the PM accumulating amount ML move along a line, which is substantially in parallel with the latter PM increasing characteristic line. In this situation, when particulate matters start burning from this accumulating condition, the relationship between the differential pressure dP and the PM accumulating amount ML returns to the initial point.

As referred to FIGS. 4, 5, when particulate matters in pores are completely burned and eliminated, and when particulate matters remain on the surface of the DPF walls, the relationship between the differential pressure dP and the PM accumulating amount ML move along a limit accumulating characteristic line. The limit accumulating characteristic line passes through the initial point and has a slope that is equivalent to the slope of the latter PM increasing characteristic line.

The accumulating characteristic of particulate matters, when the PM accumulating amount ML increases on the particulate filter, is different from the accumulating characteristic of particulate matters when the PM accumulating amount ML decreases on the particulate filter. Accordingly, it is hard to estimate the PM accumulating amount ML in an operating condition, in which particulate matters repeat accumulating and burning. In this embodiment, as shown in FIG. 4, a forcible transition is performed such that the relationship (accumulating characteristic) between the differential pressure dP and the PM accumulating amount ML is forcibly moved from the latter PM increasing characteristic line to the limit accumulating characteristic line through a forcible transition area. After performing the forcible transition, the PM accumulating amount ML increases along the limit accumulating characteristic line, which connects the point C with the point D, so that the PM accumulating amount ML can be accurately estimated.

The ROM of the ECU 51 stores a data map (ML data map) of the PM accumulating amount ML. The ML data map includes information of the former and latter PM increasing characteristic lines and the limit accumulating characteristic line. The former and latter PM increasing characteristic lines represent a normal accumulating characteristic. The characteristic lines are defined in accordance with data obtained by experiments or the like, in advance. The ECU 51 calculates the differential pressure dP in accordance with the detected differential pressure dP and detected flow amount of exhaust gas, when the flow amount of exhaust gas is at a predetermined amount. The ECU 51 calculates the PM accumulating amount ML in reference to the normal accumulating characteristic stored in the ML data map. The ECU 51 calculates the flow amount of exhaust gas by correcting the detection signal of the flow amount of intake air based on detection signals such as the DPF inlet temperature and the DPF outlet temperature.

When the calculated PM accumulating amount ML enters the predetermined forcible transition area, particulate matters accumulating on the particulate filter 32 are forcibly burned by post injection or the like.

The ECU 51 calculates an amount of particulate matters (PM burned amount), which is burned by the forcible transition.

The latter PM increasing characteristic line is shifted to the lower side with respect to the differential pressure dP for the PM burned amount in the ML data map. When the forcible transition completes, the ECU 51 calculates the PM accumulating amount ML in reference to the limit accumulating characteristic line stored in the ML data map. When the calculated PM accumulating amount ML increases to a predetermined regeneration demand amount, the particulate filter 32 is forcibly regenerated by post injection or the like, so that particulate filter 32 is protected from excessive accumulation of particulate matters. The ROM of the ECU 51 may store the information of the characteristic lines in the ML data map as a relational formula.

Figure 6:
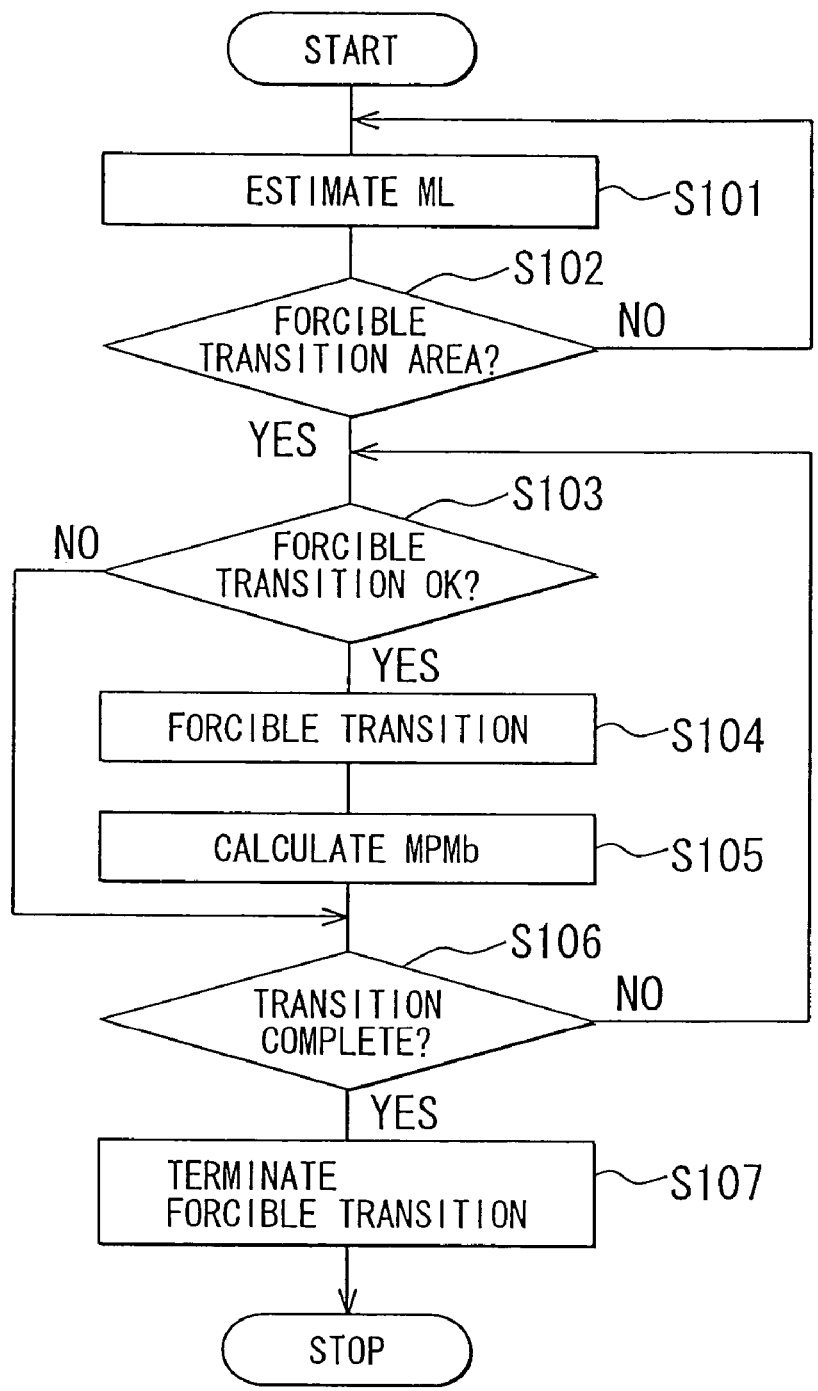
FIG. 6 is a flowchart showing a control routine executed by an ECU that controls the engine, according to the first embodiment.

Step S101 shown in FIG. 6 serves as a PM accumulating amount ML calculating means (accumulating amount calculating means). In step S101, the ECU 51 calculates the PM accumulating amount ML in accordance with a normal accumulating characteristic, which is represented by the former and latter PM increasing characteristic lines.

In step S102, it is determined whether the PM accumulating amount ML calculated in step S101 is in the forcible transition area. When the PM accumulating amount ML is not in the forcible transition area, a negative determination is made in step S102, and the routine returns to step S101.

As referred to FIGS. 4, 5, the forcible transition area is defined by the points A, B on the latter PM increasing characteristic line and the points C, D on the limit accumulating characteristic line.

Figure 7A:
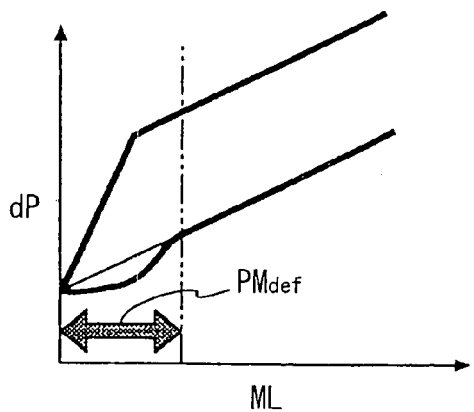
FIGS. 7A, 7B, and 7C are graphs showing relationships between the amount of particulate matters and the differential pressure of the particulate filter, according to the first embodiment.
Figure 7B:
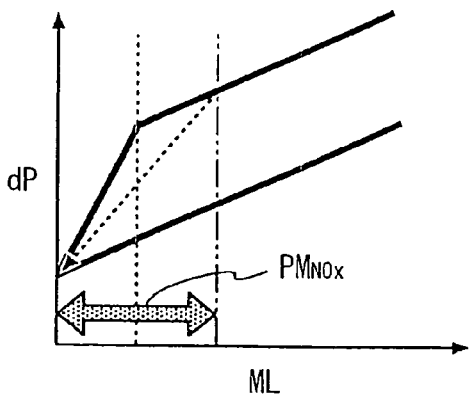

The forcible transition area is defined by a following manner. As shown in FIG. 7A, a limit accumulating characteristic is not stable on the side, in which the PM accumulating amount ML is small, i.e., on the side of the initial point, in reality. Specifically, an actual limit accumulating characteristic line is not necessarily straight in the vicinity of the initial point. Accordingly, the PM accumulating amount ML cannot be precisely estimated in accordance with the limit accumulating characteristic line, which is approximated to be a substantially straight line, in the vicinity of the initial point. The width of the range, in which the limit accumulating characteristic is not stable, is defined as 0-PMdef. Estimation of the PM accumulating amount ML may cause an error in the range 0-PMdef of the limit accumulating characteristic. Accordingly, the PM accumulating amount ML is not preferably estimated in the range 0-PMdef of the limit accumulating characteristic. The dotted line shown in FIG. 7B is a characteristic line representing a burning process. The dotted line has the slope that is gentler than the slope of the former PM increasing characteristic line of the normal accumulating characteristic. In this case, particulate matters accumulating on the surface of the DPF walls burn, as well as particulate matters in the pores.

Here, PMNOx is defined as a largest decreasing amount of the PM accumulating amount ML when the PM accumulating amount ML decreases from the normal accumulating characteristic to the limit accumulating characteristic after burning the particulate matters in a burning process.

Figure 7C:
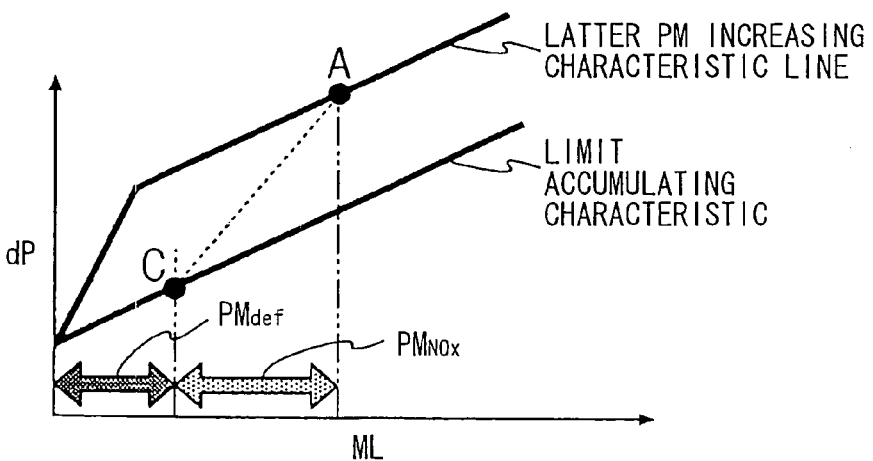

As shown in FIG. 7C, a standard PM accumulating amount C is defined as PMdef+PMNOx such that accuracy of the estimation of the PM accumulating amount ML can be maintained after the forcible transition is performed from the point A when the PM accumulating amount ML is the standard PM accumulating amount C. Thereby, even when the PM accumulating amount ML decreases from the normal accumulating characteristic to the limit accumulating characteristic, estimation of the PM accumulating amount ML is not performed in the range 0-PMdef of the limit accumulating characteristic. As referred to FIGS. 4, 5, the points A, B on the latter PM increasing characteristic line are respectively defined based on the points C, D on the limit accumulating characteristic line. The point A corresponds to the point C. When the PM accumulating amount ML is equal to or less than an accumulating amount of particulate matters corresponding to the point C on the limit accumulating characteristic line, accuracy of the estimation of the PM accumulating amount ML in accordance with the limit accumulating characteristic line becomes low.

The point B is defined corresponding to the point D. The point D is defined such that the PM accumulating amount ML does not increase to the regeneration demand amount in the forcible transition, in consideration of a maximum degree of error arising in estimating the PM accumulating amount ML.

Figure 8:
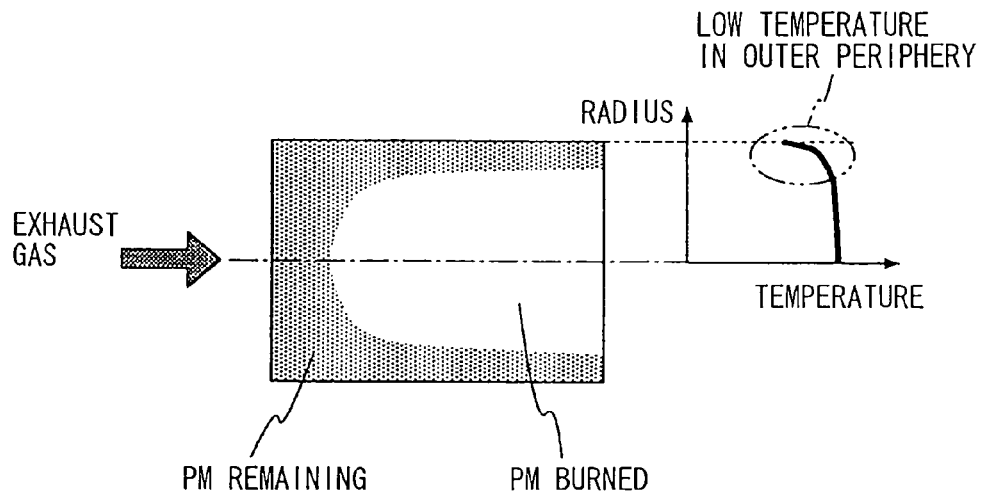
FIG. 8 is a schematic view showing distribution of particulate matters remaining on the particulate filter, according to the first embodiment.

Next, the reason why an error in the estimation of the PM accumulating amount ML becomes large in the range 0-PMdef is described. FIG. 8 depicts a distribution of particulate matters in the particulate filter 32 after particulate matters are burned and the PM accumulating amount ML is in the range 0-PMdef on the limit accumulating characteristic line. In the particulate filter 32, temperature of the downstream portion of the particulate filter 32 becomes higher than temperature of the upstream portion thereof. Therefore, a large amount of particulate matters remain on the upstream side of the particulate filter 32 compared with the downstream side of the particulate filter 32. Temperature of the atmosphere around the particulate filter 32 is significantly lower than temperature inside of the particulate filter 32. Therefore, temperature of the particulate filter 32 becomes low on the outer periphery of the particulate filter 32, which is radially outer side to the atmosphere. Therefore, particulate matters are apt to remain without burning on the radially outer peripheral side of the particulate filter 32. As a result, particulate matters are apt to burn on the surface of the DPF walls in the vicinity of the center on the downstream side of the particulate filter 32, and the basis material of the particulate filter 32 tends to be exposed. By contrast, particulate matters are apt to remain on other regions in the particulate filter 32. Thus, as shown in FIG. 7A, the limit accumulating characteristic is apt to be nonlinear in the vicinity of the initial potion due to nonuniformity in burning condition of particulate matters. Furthermore, nonuniformity in remaining particulate matters varies due to the flow amount of exhaust gas and temperature of the atmosphere around the particulate filter 32, therefore the nonuniformity of remaining particulate matters is unstable. Accordingly the range 0-PMdef, in which an error arising in the estimation of the PM accumulating amount ML, exists on the limit accumulating characteristic line.

Next, the degree of the PMNOx is described. A burning condition of particulate matters is affected by reaction between the particulate matters and NO2 contained in exhaust gas, as well as reaction between the particulate matters and the catalyst on the particulate filter 32. Therefore, burning speed of the particulate matters depends on a contact condition between the particulate matters and the catalyst and a contact condition between the particulate matters and NO2. As the contact condition between the particulate matters and the catalyst improves, and as the contact condition between the particulate matters and NO2 improves, combustion speed of particulate matters becomes high. Particulate matters accumulating on the particulate filter 32 are roughly categorized as particulate matters in the pores or particulate matters on the surface of the DPF walls. The contact condition between the particulate matters and the catalyst is excellent in the pores. The contact condition between the particulate matters and the NO2 in the pores is considered equivalent to the contact condition between the particulate matters and the NO2 on the surface of the DPF walls. On the whole, burning speed of the particulate matters on the surface of the DPF walls is not higher than burning speed of the particulate matters in the pores.

Even when a large amount of the particulate matters on the surface of the DPF walls burns, the differential pressure dP of the particulate filter 32 does not significantly change. Therefore, when burning speed of the particulate matters on the surface of the DPF walls becomes highest, the slope of the characteristic line of the burning process becomes gentlest.

On the whole, burning speed of the particulate matters on the surface of the DPF walls does not exceed burning speed of the particulate matters in the pores. Therefore, the PMNOx can be set in consideration of this fact. Specifically, the PMNOx is estimated in a condition, in which the burning speed of the particulate matters on the surface of the DPF walls equals to the burning speed of particulate matters in the pores, and the standard PM accumulating amount C is set based on the estimated PMNOx. Thereby, the PM accumulating amount ML does not move into the range 0-PMdef, in which error in the estimation of the PM accumulating amount ML becomes large, on the limit accumulation characteristic line.

Figure 9:
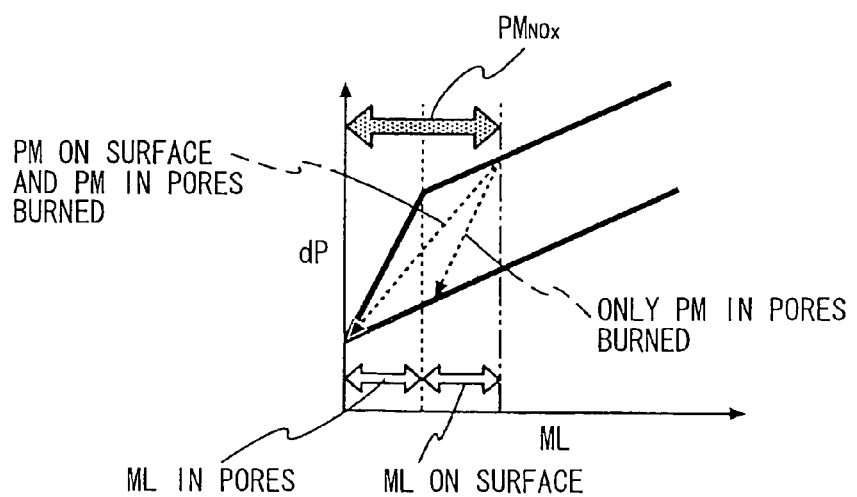
FIG. 9 is a graph showing a relationship between the amount of particulate matters and the differential pressure of the particulate filter, when particulate matters on the particulate filter are burned, according to the first embodiment.

As shown in FIG. 9, the PM accumulating amount ML in the pores is substantially equivalent to the PM accumulating amount ML on the transition point. When the burning speed of the particulate matters on the surface of the DPF walls substantially equals to the burning speed of the particulate matters in the pores, particulate matters on the surface of the DPF walls burn for the same amount of particulate matters, which burn in the pores. Therefore, the PMNOx may be set substantially twice the PM accumulating amount ML on the transition point. Thereby, the PM accumulating amount ML does not move into the range 0-PMdef on the limit accumulation characteristic, even when particulate matters on the surface of the DPF walls burn at the highest burning speed.

Figure 10A:
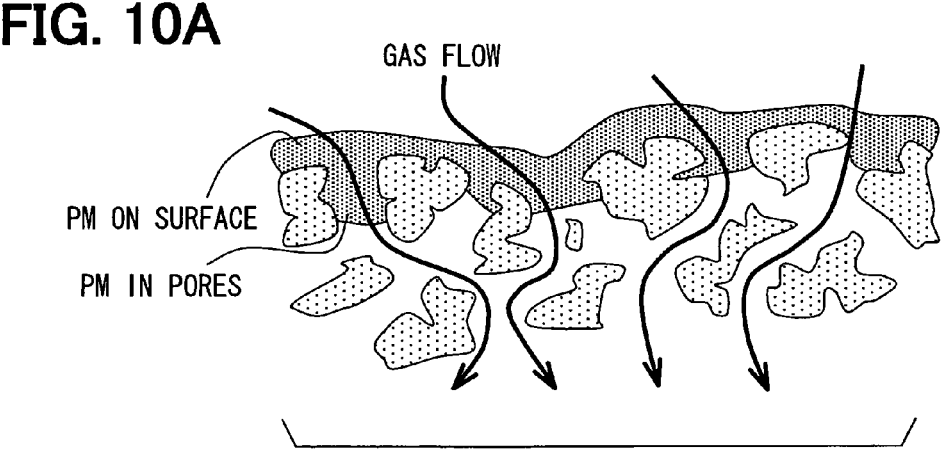
FIGS. 10A, 10B, and 10C are schematic views showing a condition, in which particulate matters accumulating on the particulate filter are burned, according to the first embodiment.
Figure 10B:
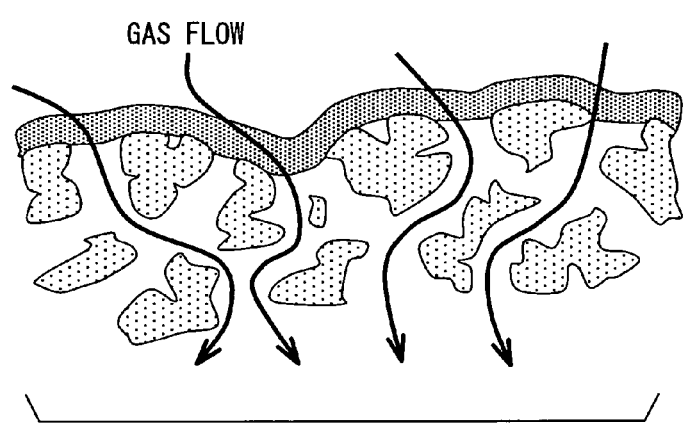
Figure 10C:
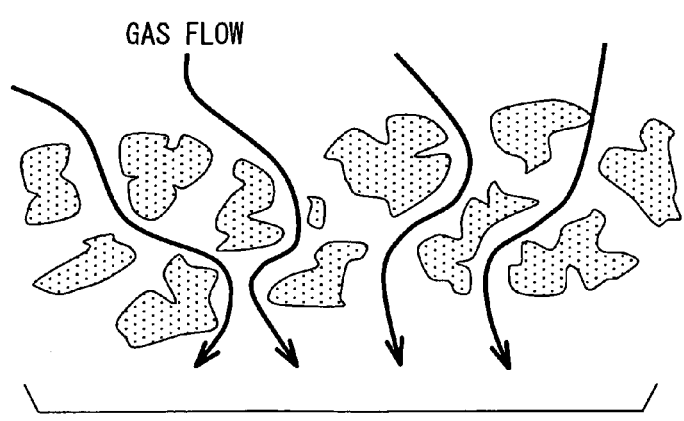

FIGS. 10A, 10B, and 10C depict particulate matters, which burn in this order in the above burning condition. Specifically, an actual PM accumulating amount ML is twice the PM accumulating amount ML on the transition point, and the burning speed of particulate matters on the surface of the DPF walls substantially equals to the burning speed of particulate matters in the pores, in the condition of FIGS. 10A, 10B, and 10C. In this situation, particulate matters on the surface of the DPF walls completely burn simultaneously with that particulate matters in the pores completely burn. The PM accumulating amount ML moves from the normal accumulating characteristic to the initial point, on which the PM accumulating amount ML is substantially zero, on the limit accumulating characteristic (FIG. 7B).

When an amount of NO2 emitted from the engine is controlled to be small, the burning speed of particulate matters on the surface of the DPF walls becomes less than the burning speed of particulate matters in the pores. Therefore, the PMNOx may be set to be equal to or greater than the PM accumulating amount ML on the transition point, and the PMNOx may be set to be less than twice the PM accumulating amount ML on the transition point.

As referred to FIG. 6, when the PM accumulating amount ML calculated in step S101 is in the forcible transition area, a positive determination is made in step S102, and subsequently it is evaluated whether the ECU 51 can perform the forcible transition in step S103. Specifically in step S103, the ECU 51 can perform the forcible transition when temperature of the particulate filter 32 can be increased equal to or greater than a predetermined standard temperature for starting burning particulate matters by post injection, for example. When a negative determination is made in step S103, the routine proceeds to step S106.

Figure 11:
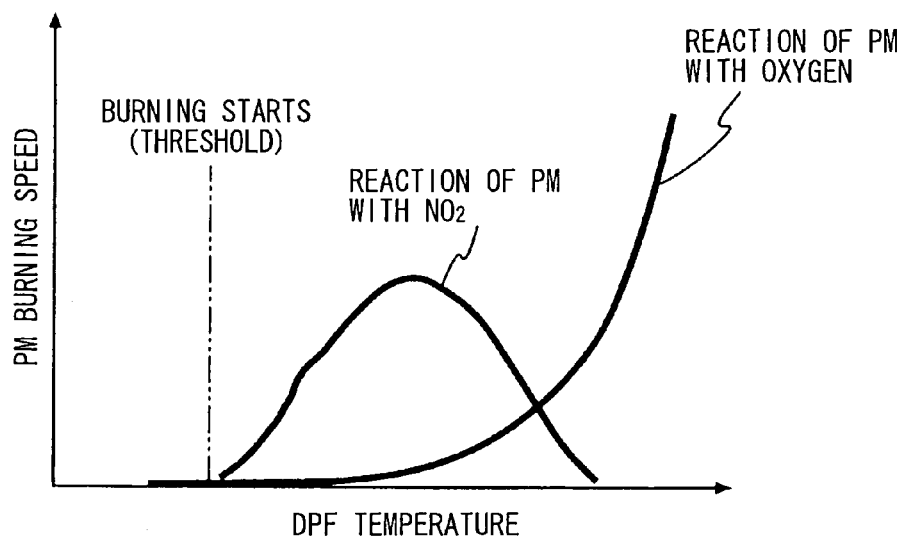
FIG. 11 is a graph showing a relationship between temperature of the particulate filter and burning speed of particulate matters, according to the first embodiment.

As shown in FIG. 11, reaction of particulate matters with NO2 may cause in low range of temperature (DPF temperature) of the particulate filter 32, compared with reaction of particulate matters with the catalyst. Therefore, the standard temperature (threshold) is set at temperature, at which particulate matters reacts with NO2.

As referred to FIG. 11, with regard to reaction between the particulate matters (PM) and NO2, burning speed of the particulate matters decreases in a high range of the DPF temperature. By contrast, with regard to reaction between particulate matters (PM) and oxygen, burning speed of particulate matters rather increases in the high range of the DPF temperature, as the DPF temperature increases. When the DPF temperature is equal to or greater than the standard temperature (threshold), it is considered that the particulate matters can be burned by performing the forcible transition.

The ECU 51 does not perform the forcible transition in the case where the DPF temperature does not increase equal to or greater than the standard temperature even the ECU 51 performs the forcible transition. Besides, the ECU 51 does not perform the forcible transition when the DPF temperature is in a high temperature condition, in which the particulate matters can be spontaneously burned, so that fuel efficiency can be maintained by restricting the forcible transition.

In step 104, the ECU 51 performs the forcible transition by post injection, for example. Subsequently in step 105, the PM burned amount of the particulate matters burned through the forcible transition is calculated. For example, the ECU 51 calculates the burning speed of the particulate matters in the pores in accordance with the DPF temperature and the PM accumulating amount ML. The ECU 51 integrates the calculated burning speed of the particulate matters from the beginning of burning the particulate matters, so that the ECU 51 can calculate the PM burned amount.

Subsequently, in step S106, it is evaluated whether accumulating characteristic of the PM accumulating amount ML completely moved from the normal accumulating characteristic to the limit accumulating characteristic by burning the particulate matters in the forcible transition. For example, a positive determination is made in step S106 when the PM burned amount calculated in step S105 increases from the beginning of burning the particulate matters to the PM accumulating amount ML, which is on the transition point in the normal accumulating characteristic. When a negative determination is made in step S106, the routine returns to step S103, and the ECU 51 continues the forcible transition.

When the normal accumulating characteristic completely moves to the limit accumulating characteristic by burning the particulate matters through the forcible transition, a positive determination is made in step S106, and the routine (forcibly transition regeneration) terminates in step S107.

As referred to FIG. 4, when the forcible transition begins, the forcible transition continues before the normal accumulating characteristic moves to the limit accumulating characteristic, in this embodiment. Therefore, the accumulating characteristic need not be frequently corrected as the particulate matters burn. As referred to FIG. 5, when the ECU 51 determines that it is difficult to continue the forcible transition, the ECU 51 terminates the forcible transition until the operating condition changes to a condition, in which the ECU can perform the forcible transition. Therefore, fuel efficiency can be restricted from being degraded due to redundantly performing the forcible transition.

(Second Embodiment)

Figure 12:
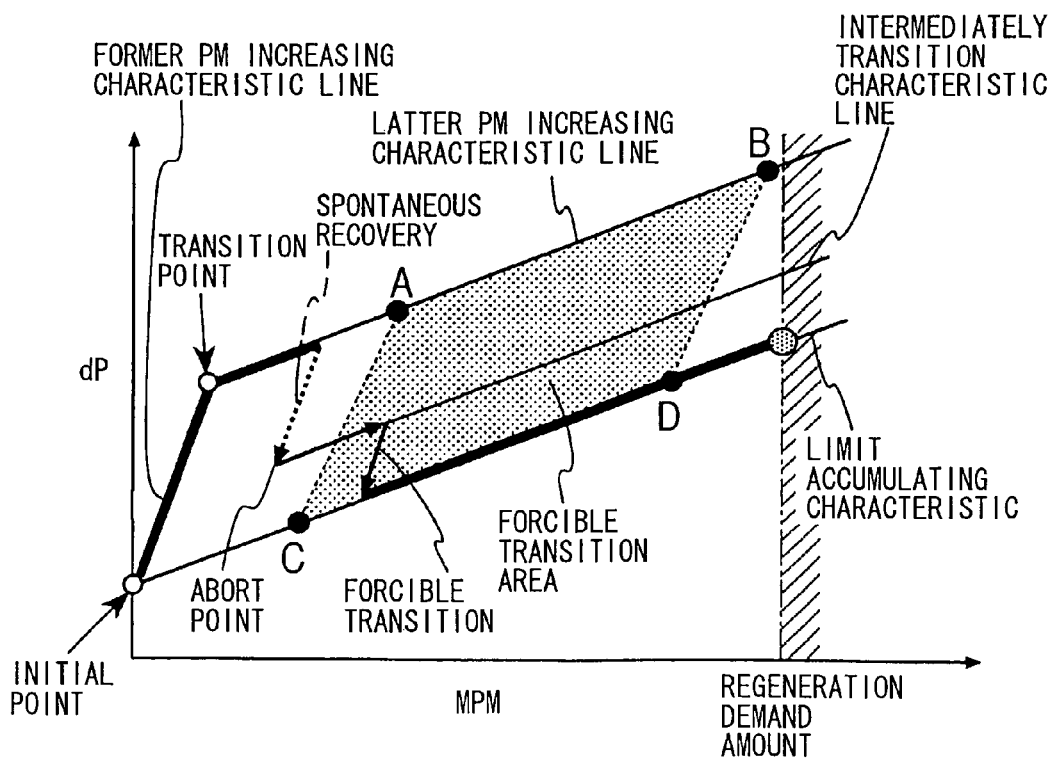
FIG. 12 is a graph showing a relationship between the amount of particulate matters and the differential pressure of the particulate filter when spontaneous regeneration arises in the particulate filter, according to a second embodiment of the present invention.

The transition from the normal accumulating characteristic to the limit accumulating characteristic can be performed in another manner. FIG. 12 depicts a condition, in which spontaneous regeneration arises on the latter PM increasing characteristic line in a region excluding the forcible transition area. Subsequently, the spontaneous regeneration aborts on the way, in which the accumulating characteristic moves to the limit accumulating characteristic. In this situation, an intermediately transition characteristic line is set from the abort point, on which the spontaneous regeneration aborts, to be in parallel with the latter PM increasing characteristic line.

The ECU 51 calculates the PM accumulating amount in accordance with the intermediately transition characteristic line. When the PM accumulating amount increases into the forcible transition area, the ECU 51 performs the forcible transition such that the accumulation characteristic moves to the limit accumulating characteristic. Subsequently, the ECU 51 calculates the PM accumulating amount in accordance with the limit accumulating characteristic. When the calculated PM accumulating amount increases to the regeneration demand amount, the ECU 51 forcibly regenerates the particulate filter 32, so that particulate matters are burned and eliminated from the particulate filter 32.

Figure 13:
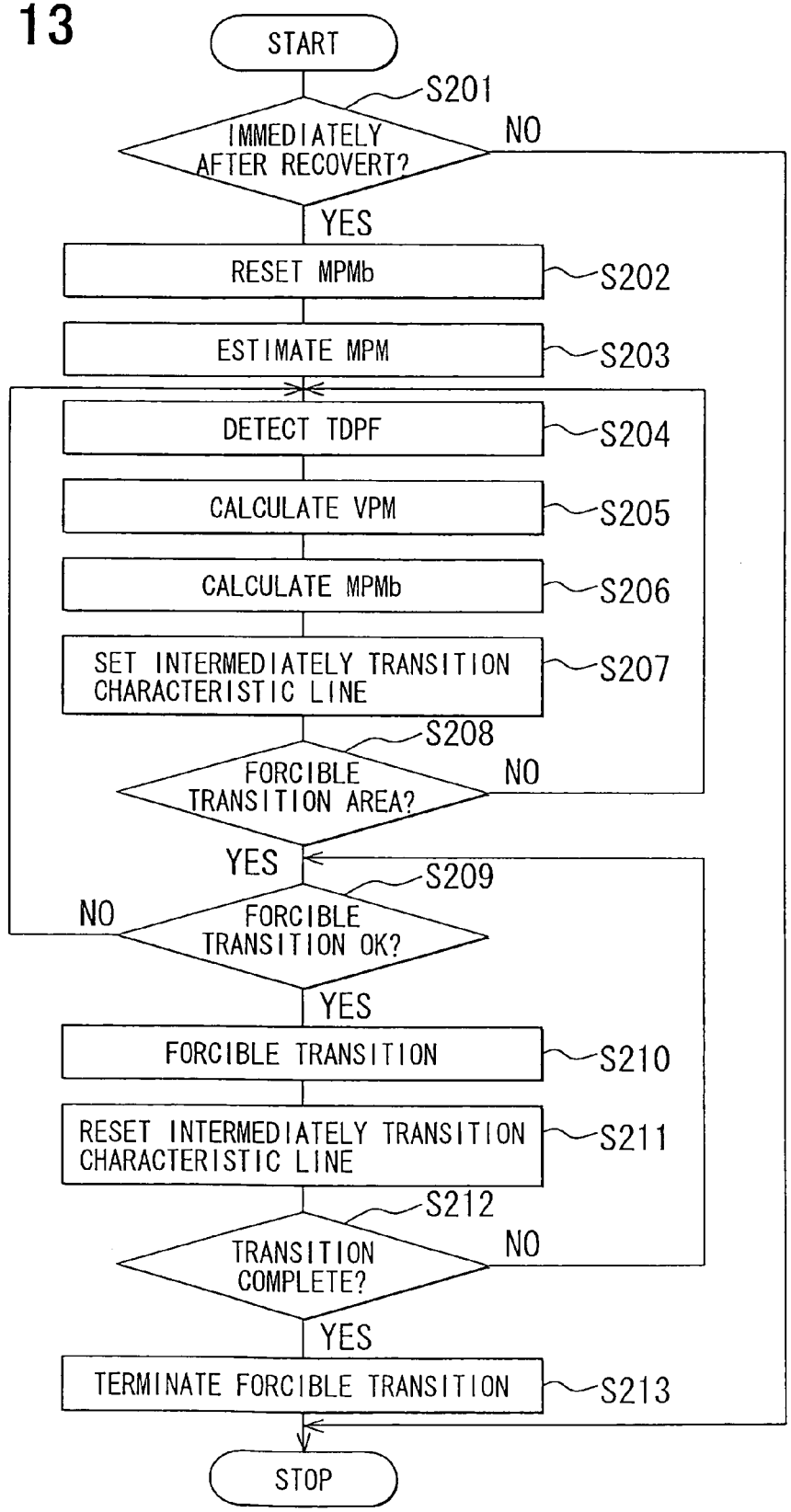
FIG. 13 is a flowchart showing a control routine executed by the ECU, according to the second embodiment.

In step S201 in FIG. 13, it is evaluated whether regeneration of the particulate filter 32 is completed or not. When a negative determination is made in step S201, the routine terminates. When a positive determination is made in step S201, the routine proceeds to step S202, in which a PM burned amount MPMb is reset. Subsequently in step S203, the ECU 51 estimates a PM accumulating amount MPM in accordance with the normal accumulating characteristic.

Steps S204 to S206 serve as a burned amount calculating means. In step S204, the ECU 51 calculates a DPF temperature TDPF based on a detection signal. In step S205, the ECU 51 calculates a burning speed (PM burning speed VPM) of particulate matters in accordance with the PM accumulating amount MPM and the DPF temperature TDPF. The ROM of the ECU 51 stores a PM burning speed data map that includes information of the PM burning speed VPM, which are stored corresponding to the PM accumulating amount MPM and the DPF temperature TDPF. The ECU 51 determines the PM burning speed VPM in reference to the PM burning speed data map.

Figure 14:
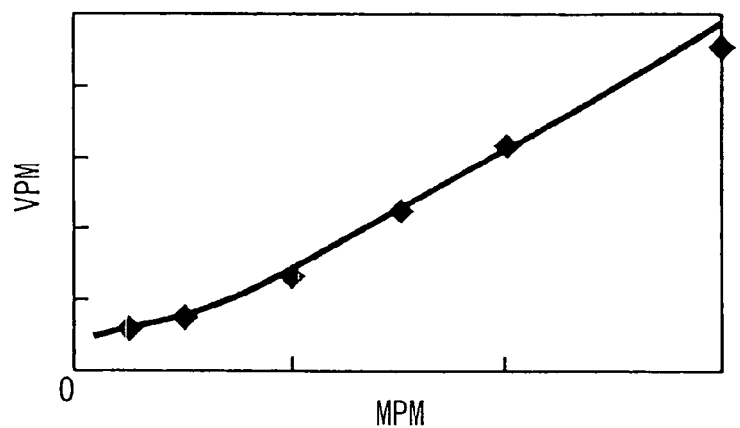
FIG. 14 is a graph showing a relationship between the amount of particulate matters accumulating on the particulate filter and the burning speed of particulate matters, according to the second embodiment.
Figure 15:
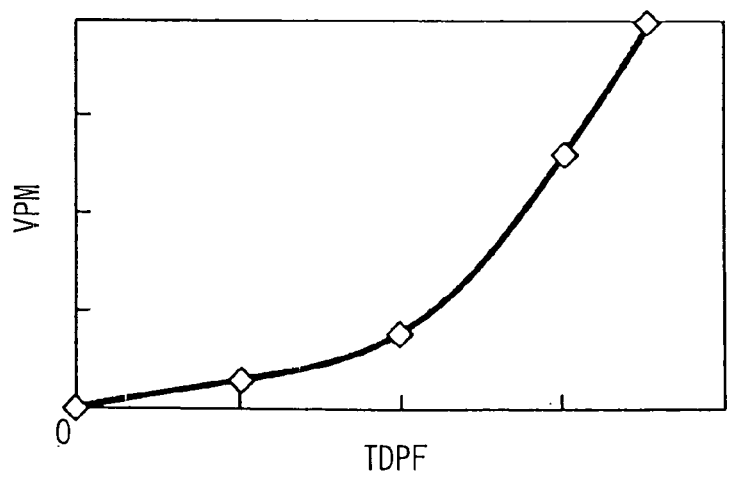
FIG. 15 is a graph showing a relationship between the temperature of the particulate filter and the burning speed of particulate matters, according to the second embodiment.

As shown in FIG. 14, as the PM accumulating amount MPM increases, the PM burning speed VPM increases. As shown in FIG. 15, as the DPF temperature TDPF increases, the PM burning speed VPM increases. The PM burning speed data map is predetermined in accordance with data obtained by experiments, for example.

In step S206 in FIG. 13, the ECU 51 calculates the PM burned amount MPMb by integrating the PM burning speed VPM. Specifically, the ECU 51 adds the previous value of the PM burned amount MPMb to the present value of the PM burning speed VPM to calculate and update the PM burned amount MPMb. The PM burned amount MPMb is standardized to be a value that has a unit time as a sampling period of the temperature sensors 53*a*, 53*b* of exhaust gas.

The burned amount MPMb of the particulate matters is a summation of a burned amount of the particulate matters by reaction with oxygen and a burned amount of particulate matters by reaction with NOx.

In step S207, the ECU 51 sets the intermediately transition characteristic line by correcting the latter PM increasing characteristic line in accordance with the PM burned amount MPMb calculated in step S206. Specifically, the ECU 51 shifts the latter PM increasing characteristic line parallel to the side, on which the differential pressure dP becomes small.

Procedure in steps 208 to 213 is similar to the procedure in steps S102 to S107. In step S211, the ECU 51 resets the intermediately transition characteristic line similarly to step S207. Specifically, the ECU 51 calculates the burned amount of the particulate matters burned through the forcible transition similarly to step S105, and sets the intermediately transition characteristic line in accordance with the calculated burned amount of the particulate matters.

In this embodiment, the ECU 51 sets the intermediately transition characteristic line, which is corrected in accordance with the PM burned amount MPMb, in advance of evaluation whether the ECU 51 performs the forcible transition or when burning of particulate matters is detected after performing the forcible transition.

Here, the PM burned amount MPMb is a burned amount of the particulate matters burning from a condition immediately after complete regeneration. The ECU 51 defines the degree of shifting the latter PM increasing characteristic line to the intermediately transition characteristic line in accordance with the PM burned amount MPMb.

The routine following step S208 is not executed, as long as the spontaneous burning continues. Thereby, the accumulating characteristic moves from the normal accumulating characteristic to the limit accumulating characteristic by spontaneous regeneration without performing the forcible transition. When the spontaneous regeneration aborts midway, the ECU 51 calculates the PM accumulating amount MPM in accordance with the intermediately transition characteristic line. When the PM accumulating amount MPM increases into the forcible transition area, the ECU 51 executes the routine from the S208.

When particulate matters are substantially completely burned while the PM accumulating amount MPM decreases along the limit accumulating characteristic line, which is the substantially straight line defining the limit accumulating characteristic, and when the PM accumulating amount MPM decreases to the initial point, the ECU 51 returns the accumulating characteristic from the limit accumulating characteristic line to the former increasing characteristic.

The PM burned amount is not limited to be detected in such a manner described above. The PM burned amount can be estimated in accordance with variation in quantity of states of the engine body 1 and the particulate filter 32. The quantity of states of the engine body 1 and the particulate filter 32 may include temperature of exhaust gas, concentration of NOx, concentration of oxygen, the accumulating amount of particulate matters calculated using the MPM calculating means. The quantity of states of the engine body 1 and the particulate filter 32 may include detection signal of the differential pressure dP, rotation speed of the engine, an injection amount of fuel, speed of the vehicle, which includes the exhaust gas purification device, variation in an amount of intake air, which is drawn into the cylinder of the engine, per unit time, for example.

(Modified Embodiment)

Figure 16:
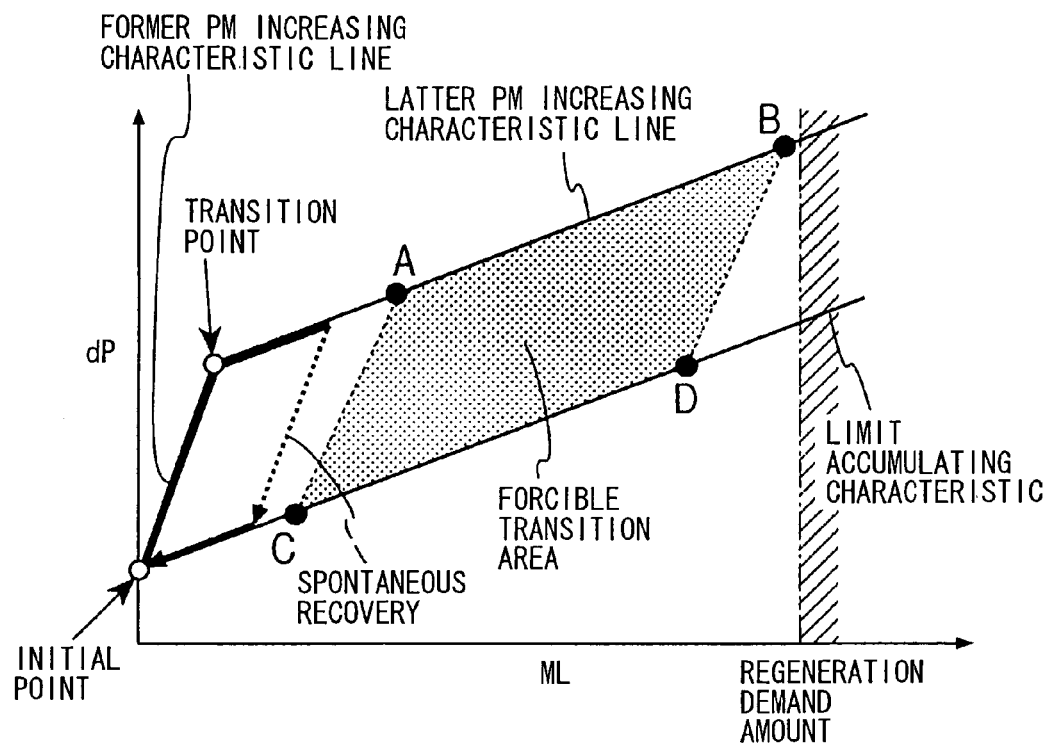
FIG. 16 is a graph showing a relationship between the amount of particulate matters and the differential pressure of the particulate filter, according to a first modified embodiment of the present invention.

As shown in FIG. 16, the spontaneous regeneration of the particulate filter 32 arises on the latter PM increasing characteristic line in a region excluding the forcible transition area. Specifically, the particulate matters spontaneously burn in the region excluding the forcible transition area, and the accumulation characteristic completely moves to the limit accumulation characteristic line. In this case, the PM accumulating amount ML on the limit accumulation characteristic line becomes equal to or less than the standard PM accumulating amount C that defines the forcible transition area. In this situation, accuracy of estimation of the PM accumulating amount ML may be low. In this case, the ECU 51 performs the forcible regeneration until the particulate matters are substantially completely removed, so that the PM accumulating amount ML decreases to the initial point. Thereby, the PM accumulating amount ML can be restricted from being estimated in a region, in which accuracy of estimating the PM accumulating amount ML is low.

Figure 17:
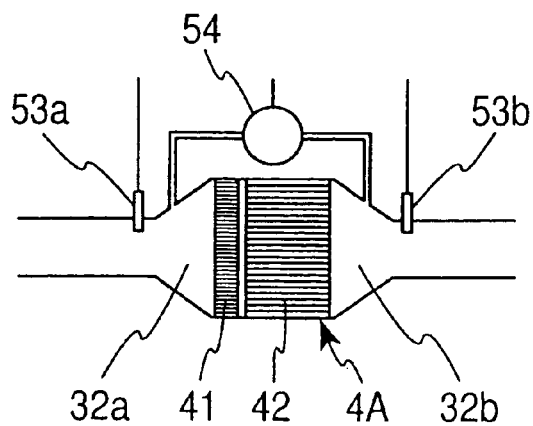
FIG. 17 is schematic view showing an internal combustion engine including an exhaust gas purifying device, according to a second modified embodiment of the present invention.
Figure 18:
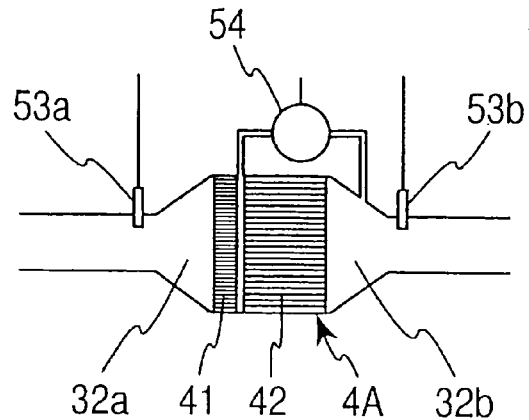
FIG. 18 is schematic view showing an internal combustion engine including an exhaust gas purifying device, according to a third modified embodiment of the present invention.
Figure 19:
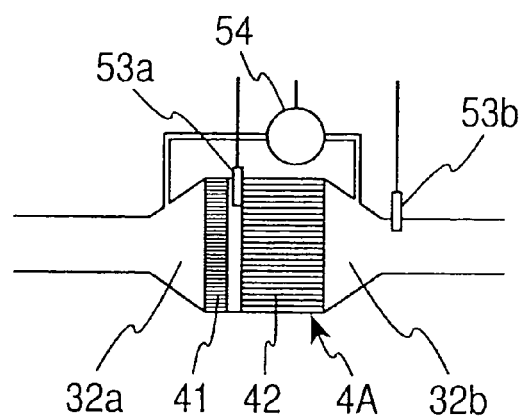
FIG. 19 is schematic view showing an internal combustion engine including an exhaust gas purifying device, according to a fourth modified embodiment of the present invention.
Figure 20:
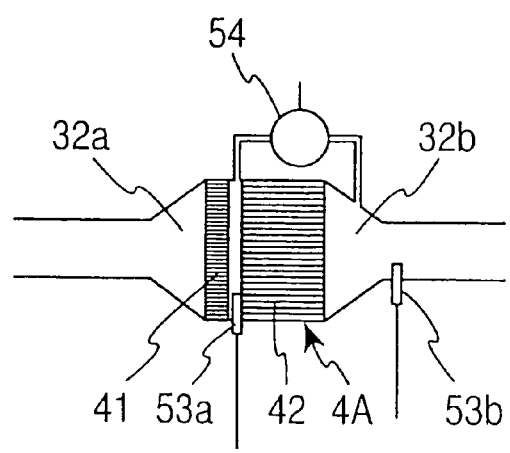
FIG. 20 is schematic view showing an internal combustion engine including an exhaust gas purifying device, according to a fifth modified embodiment of the present invention.

As shown in FIG. 17, the particulate filter body 4A may have a pre-catalyst structure, in which the catalyst 41 is provided on the upstream side of the filter body 42. As shown in FIG. 18, the differential pressure sensor 54 may be provided between the upstream and the downstream of the filter body 42 to detect differential pressure of the filter body 42 in the pre-catalyst structure. As shown in FIG. 19, the temperature sensor 53*a* may be provided between the catalyst 41 and the filter body 42 to detect temperature between the catalyst 41 and the filter body 42. As shown in FIG. 20, the differential pressure sensor 54 may be provided between the upstream and the downstream of the filter body 42 to detect differential pressure of the filter body 42, and the temperature sensor 53*a* may be provided between the catalyst 41 and the filter body 42, similarly to the structures referred to FIGS. 18, 19. The filter body 42 may have a structure, in which the catalysts are unsupported.

The structures and methods of the above embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An exhaust gas purifying device for an internal combustion engine, the purifying device comprising:

a particulate filter that is provided midway in an exhaust passage, the particulate filter collecting particulate matters contained in exhaust gas, wherein particulate matters accumulate on the particulate filter by being collected by the particulate filter;

a differential pressure detecting means that detects differential pressure of the particulate filter; and a control means that performs a forcible regeneration, in which particulate matters accumulating on the particulate filter are burned and removed to regenerate the particulate filter, when an accumulating amount of particulate matters accumulating on the particulate filter becomes a predetermined regeneration demand amount, wherein the control means includes an accumulating amount calculating means, which calculates the accumulating amount in accordance with an accumulating characteristic and at least the differential pressure, the control means defines the accumulating characteristic that is a relationship between the accumulating amount and the differential pressure, the control means defines a former increasing characteristic line on a side, on which the accumulating amount is equal to or less than an accumulating amount defined on a predetermined transition point, wherein the former increasing characteristic line is a substantially straight line passing through an initial point, on which the accumulating amount is zero, the control means defines a latter increasing characteristic line on a side, on which the accumulating amount is greater than the accumulating amount defined on the transition point, wherein the latter increasing characteristic line is a substantially straight line having a slope gentler than a slope of the former increasing characteristic line, when the differential pressure increases from the initial point along the former increasing characteristic line, and when the differential pressure becomes greater than a differential pressure defined on the transition point, the differential pressure increases along the latter increasing characteristic line, the control means defines a limit accumulating characteristic with a substantially straight line that passes through the initial point and has a slope substantially the same as the slope of the latter increasing characteristic line, the control means further includes a forcible transition means that performs a forcible transition when the accumulating amount, which is calculated in accordance with the accumulating characteristic, enters a predetermined forcible transition area, particulate matters accumulating on the particulate filter are burned in the forcible transition until the accumulating characteristic substantially becomes the limit accumulating characteristic, and the accumulating amount calculating means moves the accumulating characteristic to the limit accumulating characteristic until the accumulating characteristic substantially becomes the limit accumulating characteristic when particulate matters accumulating on the particulate filter are burned by the forcible transition means.

2. The purifying device according to claim 1, wherein the forcible transition means evaluates whether particulate matters accumulating on the particulate filter are capable of being burned in the forcible transition area, in accordance with an operating condition of the internal combustion engine, when it is determined that particulate matters accumulating on the particulate filter are not capable of being burned, the forcible transition means does not perform the forcible transition, and when the operating condition of the internal combustion engine becomes a condition, in which particulate matters accumulating on the particulate filter are capable of being burned, the forcible transition means performs the forcible transition.

3. The purifying device according to claim 1, wherein when the operating condition of the internal combustion engine is in a condition, in which particulate matters accumulating on the particulate filter are callable of spontaneously being burned in the forcible transition area, the forcible transition means does not perform the forcible transition, and when the operating condition of the internal combustion engine becomes a condition, in which particulate matters accumulating on the particulate filter are not capable of spontaneously being burned, the forcible transition means performs the forcible transition.

4. The purifying device according to claim 1, wherein when the accumulating characteristic intermediately moves to the limit accumulation characteristic by burning particulate matters accumulating on the particulate filter, and when particulate matters abort burning while the accumulating characteristic intermediately moves to the limit accumulation characteristic, the accumulating amount calculating means shifts the latter increasing characteristic line substantially parallel to a side, on which the differential pressure becomes small, to set a intermediately transition characteristic line, the accumulating amount calculating means calculates the accumulating amount of particulate matters accumulating on the particulate filter in accordance with the intermediately transition characteristic line, and when the accumulating amount, which is calculated in accordance with the intermediately transition characteristic line, is in the forcible transition area, the forcible transition means performs the forcible transition.

5. The purifying device according to claim 4, wherein the control means further includes a burned amount calculating means that calculates a burned amount of particulate matters accumulating on the particulate filter in accordance with at least one of a signal of an operating condition of the internal combustion engine, a signal of temperature of exhaust gas, and a signal of the differential pressure of the particulate filter, and the burned amount calculating means calculates degree of shifting the accumulation characteristic from the latter increasing characteristic line in accordance with the burned amount of particulate matters accumulating on the particulate filter calculated by the burned amount calculating means when the accumulating amount calculating means sets the intermediately transition characteristic line.

6. The purifying device according to claim 5, wherein the burned amount of particulate matters accumulating on the particulate filter is a summation of a burned amount of particulate matters by reaction with oxygen and a burned amount of particulate matters by reaction with NOx.

7. The purifying device according to claim 1, wherein when particulate matters accumulating on the particulate filter are substantially completely burned while the accumulating amount decreases along a substantially straight line defining the limit accumulating characteristic, and when the accumulating amount decreases to the initial point, the control means returns the accumulating characteristic to the former increasing characteristic line.

\* \* \* \* \*